(12) United States Patent
Lee et al.

(10) Patent No.: US 7,936,379 B2
(45) Date of Patent: May 3, 2011

(54) CAMERA WITH AUTOMATIC FLUORESCENT LIGHTING MODE

(75) Inventors: Matthew Lee, Belleville (CA); Tom Nagy, Waterloo (CA); David Noel Vanden Heuvel, Ottawa (CA); Russell Raymond Andrade, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 346 days.

(21) Appl. No.: 11/695,171

(22) Filed: Apr. 2, 2007

(65) Prior Publication Data

US 2008/0239095 A1 Oct. 2, 2008

(51) Int. Cl.
*H04N 9/73* (2006.01)

(52) U.S. Cl. .................................... 348/226.1
(58) Field of Classification Search ........................ None
See application file for complete search history.

(56) References Cited

U.S. PATENT DOCUMENTS

| | | | |
|---|---|---|---|
| 5,841,126 A | 11/1998 | Fossum et al. | |
| 6,271,884 B1 * | 8/2001 | Chung et al. | 348/370 |
| 6,295,085 B1 * | 9/2001 | Munson et al. | 348/226.1 |
| 6,519,002 B1 | 2/2003 | Tomaszewski | |
| 6,999,118 B2 * | 2/2006 | Suzuki | 348/226.1 |
| 7,126,639 B2 | 10/2006 | Cazier et al. | |
| 7,187,405 B2 | 3/2007 | Poplin et al. | |
| 7,231,374 B1 * | 6/2007 | Balasinski | 705/400 |
| 7,361,879 B2 * | 4/2008 | Lomba et al. | 250/208.1 |
| 2005/0012661 A1 * | 1/2005 | Halivaara | 342/357.06 |
| 2005/0136974 A1 * | 6/2005 | Ho et al. | 455/556.1 |
| 2005/0237394 A1 * | 10/2005 | Katiblan et al. | 348/226.1 |
| 2007/0023497 A1 * | 2/2007 | Chuang et al. | 235/375 |
| 2008/0024633 A1 * | 1/2008 | Hofer | 348/296 |

FOREIGN PATENT DOCUMENTS

WO WO 01-24535 A 4/2001

OTHER PUBLICATIONS

"Standard Power Frequencies Around the World," internet document from http://www.engr.usask.ca/classes/EE/212/notes/Freq_std.doc , undated.*

* cited by examiner

*Primary Examiner* — Lin Ye
*Assistant Examiner* — Dennis Hogue
(74) *Attorney, Agent, or Firm* — Perry + Currier

(57) ABSTRACT

A novel method and apparatus for controlling operation of a photosensor array in a portable electronic device to reduce flicker resulting from fluorescent light having a periodic intensity. The method comprises selecting a time zone in which the device is to be operated, correlating the time zone with a corresponding frequency of the fluorescent light, and signaling the photosensor array to operate in accordance with a mode optimized to reduce flicker based on the selected time zone.

20 Claims, 8 Drawing Sheets

CAMERA WITH AUTOMATIC FLUORESCENT LIGHTING MODE

FIELD

The present disclosure relates generally to digital cameras and more particularly to a digital camera with automatic fluorescent lighting mode, adapted for use within a portable electronic device.

BACKGROUND

Portable electronic devices continue to get smaller and incorporate more functions, such as traditional personal digital assistant ("PDA") functionality with cellular telephony and wireless email capability. In addition to functions oriented toward the business user, it is also known to incorporate music and video players as well as camera applications for consumer market devices.

Conventional film cameras use a photosensitive film to capture an image, whereas digital cameras use electronic photosensors such as charge coupled devices (CCDs) or complimentary metal oxide semiconductor (CMOS) chips. The term "photosensor" as used in this specification means any device(s) or material(s) capable of receiving and capturing radiant energy, and being at least partially capable of converting the radiant energy into electronic signals that become a virtual representation of the optical image. A CCD or CMOS "camera-on-a-chip" includes an array of very fine electronic "picture elements" or "pixels" arranged in horizontal rows and vertical columns that define an image resolution matrix.

U.S. Pat. No. 5,841,126 describes an exemplary camera chip that may be incorporated into a portable electronic device.

One problem associated with such photosensor arrays is the introduction of an image artifact referred to as "flicker" when the camera is capturing an imaged scene that is illuminated by a fluorescent light source. Flicker occurs as a result of periodic variations of light intensity in correspondence with the frequency of the alternating current (AC) power that interfere with the arrays ability to capture all of the image information used to form an image frame.

A fluorescent lighting system that is powered by a source of 60 Hz alternating current will exhibit periodic peaks of intensity at a rate of 120 Hz, i.e., twice the frequency of the alternating current. However, in many European countries, the AC power waveform has a frequency of 50 Hz, so that the flicker frequency of concern is 100 Hz. Thus, unless the photosensor chip includes a mechanism for addressing "beats" at this frequency, an image of a gray background captured under illumination by fluorescent lighting will include readily apparent amplitude modulations of the light intensity in a particular direction (typically the vertical direction), since the light level will vary with the capture of different lines of the image.

A number of solutions have been employed to eliminate these "beats." These include filtering systems that filter out the beat frequency, phase locking systems that attempt to lock on to the 100 Hz intensity peaks and synchronize frame capture, and a variety of other techniques.

One such other technique is set forth in U.S. Pat. No. 6,271,884 to Chung et al., which describes a digital camera with constant frame rate, but with an adjustable integration time. The integration time is defined as the amount of time that a particular sensor is permitted to capture light energy for each frame. When the camera is used in an environment having 60 Hz fluorescent lighting, the integration time is set at a multiple of 8.33 milliseconds, whereas the integration time is changed to a multiple of 10 milliseconds when the environment utilizes 50 Hz fluorescent lighting. A number of options are set forth for between the two integration times. One suggestion is that the system could detect the country in which it is operating based on system configuration data, although absolutely no details are provided on how this would be implemented.

Other approaches are known in the art for detecting flicker, such as U.S. Pat. No. 7,187,405, which detects specific repeating patterns of signal variations by processing columnar information from the device's two-dimensional sensor array.

It is also known in the art to select camera printing options for printing parameters such as printed image size and paper size in accordance with location information derived from a location subsystem, such as a GPS receiver, as described in U.S. Pat. No. 7,126,639.

It is contemplated that improvement is possible over the above-described prior art, by simplifying the manner of detecting location of a digital camera for the purpose of setting the preferred fluorescent operating mode to eliminate flicker.

BRIEF DESCRIPTION OF THE DRAWINGS

Embodiments, which are purely exemplary, will now be discussed with reference to the attached Figures in which.

DETAILED DESCRIPTION OF THE EMBODIMENTS

As discussed in greater detail below, according to an aspect of this specification, the photosensor array of a camera is configured to operate in an appropriate fluorescent lighting mode, based on the time zone that the portable electronic device is configured to operate in. This approach differs, for example from prior art approaches for establishing the fluorescent lighting mode (or other camera characteristic) based on what country the device is operating in. Indeed, since the selection of fluorescent lighting mode is based on time zone there is no need to reconfigure the fluorescent lighting mode when traveling between different countries in the same time zone.

Therefore, according to an exemplary embodiment there is provided a method for controlling operation of a photosensor array in a portable electronic device to reduce flicker resulting from fluorescent light having a periodic intensity, the method comprising selecting a time zone in which said device is to be operated; correlating said time zone with a corresponding frequency of said fluorescent light; and signaling said photosensor array to operate in accordance with a mode optimized to reduce flicker based on the selected time zone.

According to a further embodiment there is provided a portable electronic device comprising at least one user input device for selecting a time zone in which said device is to be operated; a chip having a photosensor sensor array adapted to operate in one of a plurality of modes for reducing flicker resulting from fluorescent light having a periodic intensity; a display; a persistent storage device; and a processor interconnecting said user input device, said chip, said display, and said persistent storage device, and configured to correlate said time zone with a corresponding frequency of said fluorescent light and signal said chip to operate in accordance with a mode optimized to reduce flicker based on the selected time zone.

Figure 1:
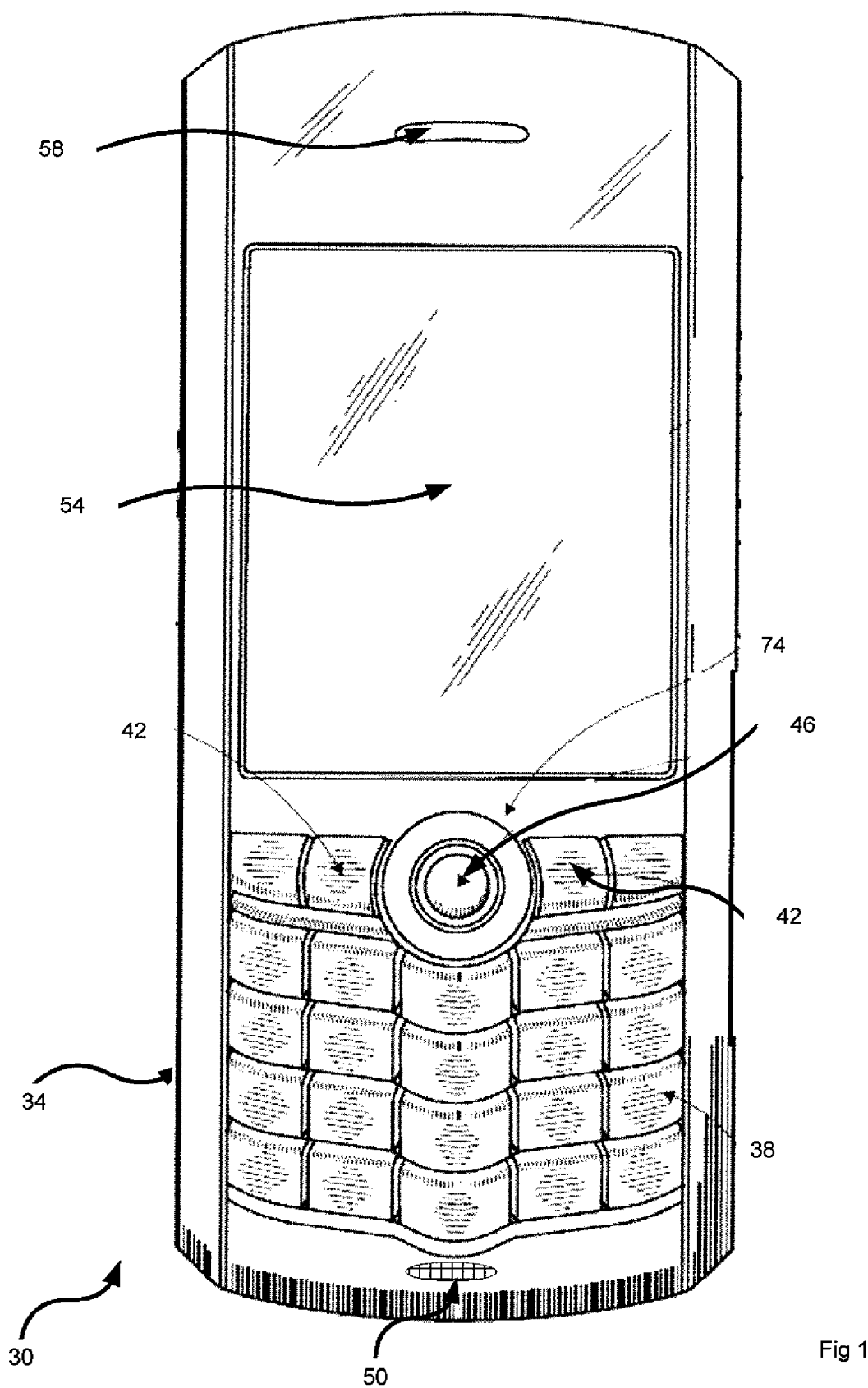
FIG. 1 is a schematic representation of a front view of a portable electronic device having a camera application, in accordance with an embodiment.

Referring now to FIG. 1, a front view of a portable electronic device in accordance with an embodiment is indicated generally at 30. In a present embodiment, device 30 includes the functionality of a wireless telephone, a wireless email paging device and a digital camera.

As best seen in FIG. 1, device 30 includes a housing 34 that frames a plurality of input devices in the form of a keyboard 38, a set of keys 42 (one of which may be a menu key), a trackball 46 and a microphone 50. Housing 34 also frames a plurality of output devices in the form of a display 54 and a speaker 58.

Accordingly, a user of device 30 can interact with the input devices and output devices to send and receive emails, conduct voice telephone calls, manage appointments and contacts, browse the Internet, and perform such other functions as can be found on a known or as-yet unconceived electronic device such as device 30.

It is to be understood that device 30 is simplified for purposes of explanation, and that in other embodiments device 30 can include, additional and/or different functions and/or applications, and include input and output devices accordingly. Such other functionality can include music playing, audio recording and video playing. An example of a combined input/output device would include a Universal Serial Bus ("USB") port, a headset jack to connect a handsfree headset to device 30, or a Bluetooth™ (or equivalent technology) transceiver. Likewise, it will be understood from the teachings herein that certain functions included in device 30 can be omitted.

Figure 2:
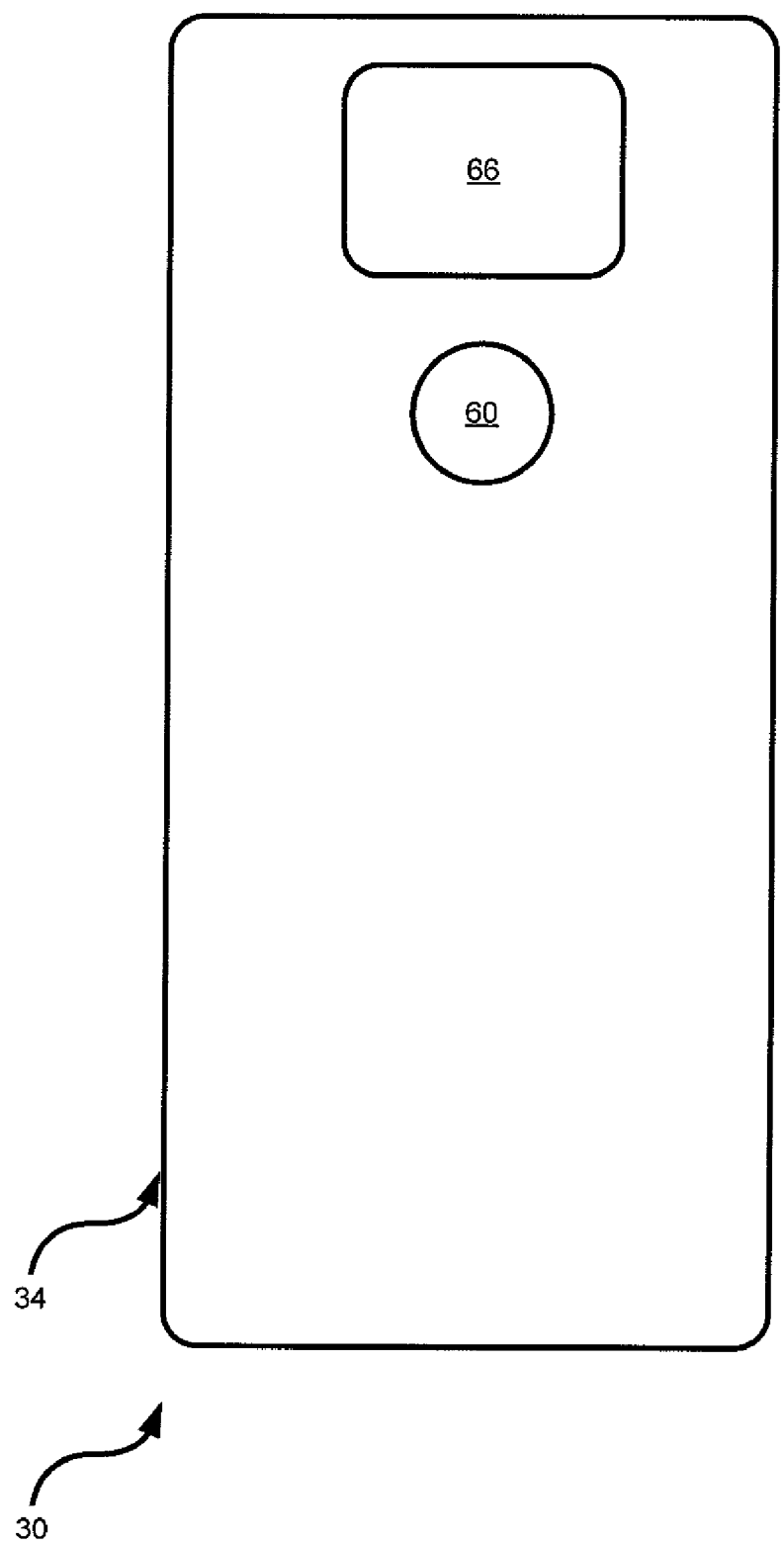
FIG. 2 is a schematic representation of a rear view of the portable electronic device of FIG. 1.

In a present embodiment, device 30 also includes a camera. Referring now to FIG. 2, a rear view of device 30 is shown. Device 30 thus also includes an additional input device in the form of a camera lens 60 and an additional output device in the form of a flash 66. As discussed in greater detail below with reference to FIGS. 3 and 4, lens 60 focuses light on image capturing photosensor chip 62, which incorporates an array of photosensitive elements, for creating an electronic signal of the image that impinges thereon via the camera lens 60.

In one embodiment, the form factor of device 30 is constructed so that a user can grasp device 30 with either a left hand, or right hand, and be able to activate keys 42 and trackball 46 with the thumb. (While trackball 46 is configured for the thumb, it should be understood that users can use other digits on their hands as well). By the same token, lens 60 and photosensor chip 62 are disposed behind display 54 so that the index finger of the user, when wrapped around device 30, does not obscure the lens and thereby interfere with the use of device 30 as a camera. The positioning of lens 60 behind display 54 also improves the usability of display 54 as a viewfinder when device 30 is acting as a camera, as the display 54 will present the scenery to the user that is directly behind display 54.

Figure 3:
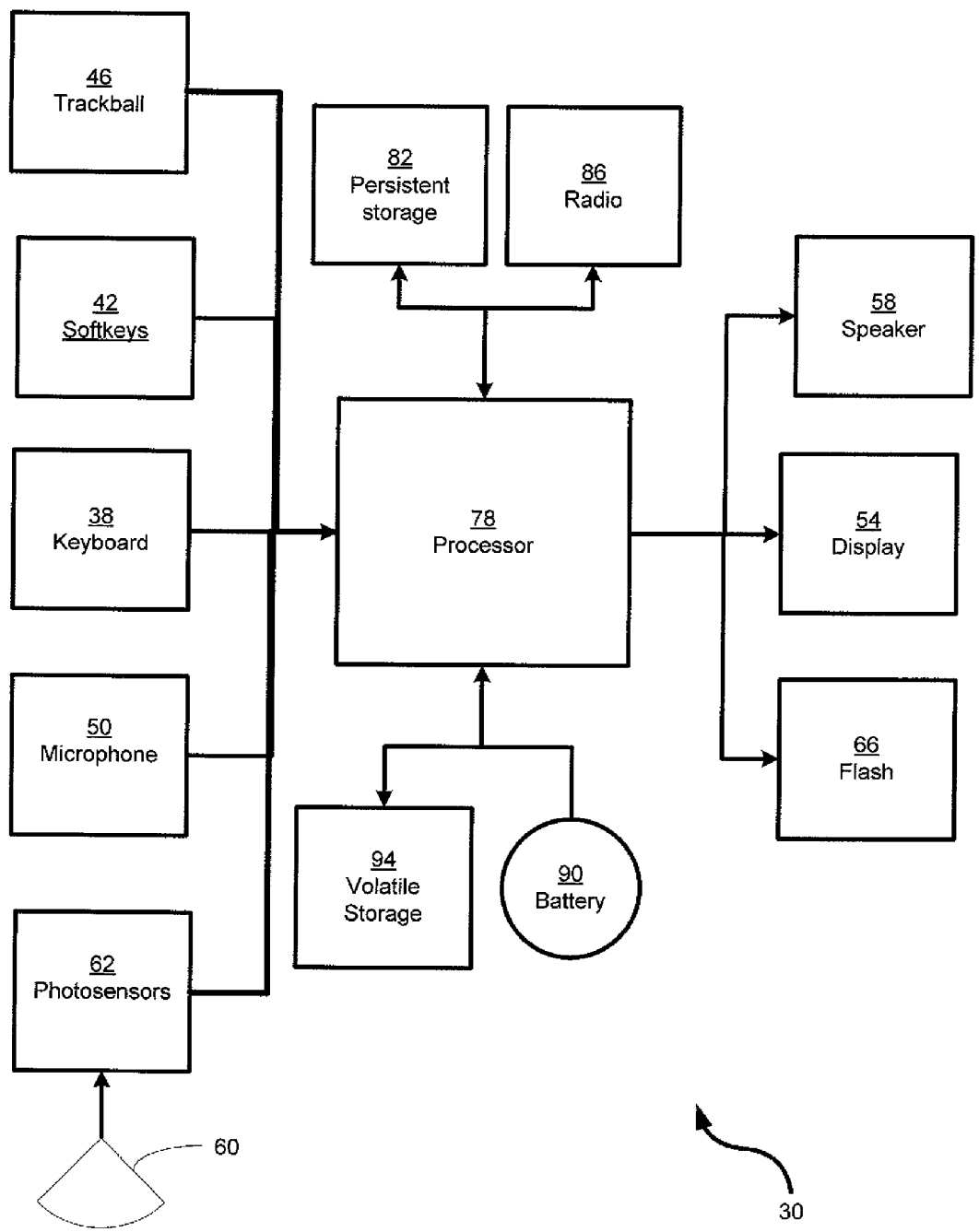
FIG. 3 is a block diagram of certain internal components of the device of FIG. 1.

Referring now to FIG. 3, a block diagram representing certain internal components of device 30 is shown. Device 30 thus includes a processor 78 which interconnects the input devices of device 30 (i.e. trackball 46, keys 42, keyboard 38, photosensor chip 62 and microphone 50) and the output devices of device 30 (i.e. speaker 58, display 54 and flash 66). Processor 78 is also connected to a persistent storage device 82. (Persistent storage device 82 can be implemented using flash memory or the like, and/or can include other programmable read only memory (PROM) technology and/or can include read-only memory (ROM) technology and/or can include a removable "smart card" and/or can be comprised of combinations of the foregoing.) As discussed in greater detail below, processor 78 executes a plurality of applications stored in persistent storage device 82, such as an email application, telephony application, Web-browsing application calendar application, contacts application, camera application and other applications that will be known to a person of skill in the art.

Device 30 also includes a wireless radio 86 disposed within housing 34 that connects wirelessly to one of a network of base stations to provide the wireless email, telephony and Web-browsing application functionality referred to above.

Device 30 also includes a battery 90 which is typically rechargeable and provides power to the components of device 30. In a present, purely exemplary embodiment, battery 66 is a lithium battery having an operating voltage of between about 3.0 Volts minimum to about 4.2 Volts maximum. In FIG. 3, for simplicity battery 90 is only shown connected to processor 78, but it will be understood that battery 90 is connected to any component (e.g. photosensor chip 62, radio 88, display 54 and flash 66) within device 30 that needs power to operate.

Device 30 also includes volatile storage 94, which can be implemented as random access memory (RAM), which can be used to temporarily store applications and data as they are being used by processor 78.

As discussed above, examples of known photosensor chips 62 include charge coupled devices (CCDs) and CMOS devices, which create an electronic signal of the image that impinges thereon via the camera lens 60. As will be known to a person of skill in the art, photosensor chip 62 incorporates an array of horizontal rows and vertical columns of photosensitive pixels that define an image resolution matrix. The maximum resolution of the camera determines the size of the pixel array. Thus, a 1.3 MP camera has a pixel array of dimensions 1280×1024, while a 2 MP camera has a pixel array of dimensions 1600×1200 (actually 1.9 MP). Each pixel also has an image resolution "depth". For example, the pixel depth of the may be 8 bits, wherein the minimum pixel brightness value is 0 and the maximum pixel brightness (saturation) value is 255.

Upon exposure to imaging light from a subject, the lens 60 focuses the light onto the array of photosensor chip 62 which collect discrete light energies or photon charges corresponding to or mapping the photographic subject or object column-by-column, row-by-row, and pixel-by-pixel such that a photon charge representation of the subject is obtained. The photosensor chip 62 processes the photon charges and converts them into useful digital signals that are clocked out for storage in volatile memory 94.

Figure 4:
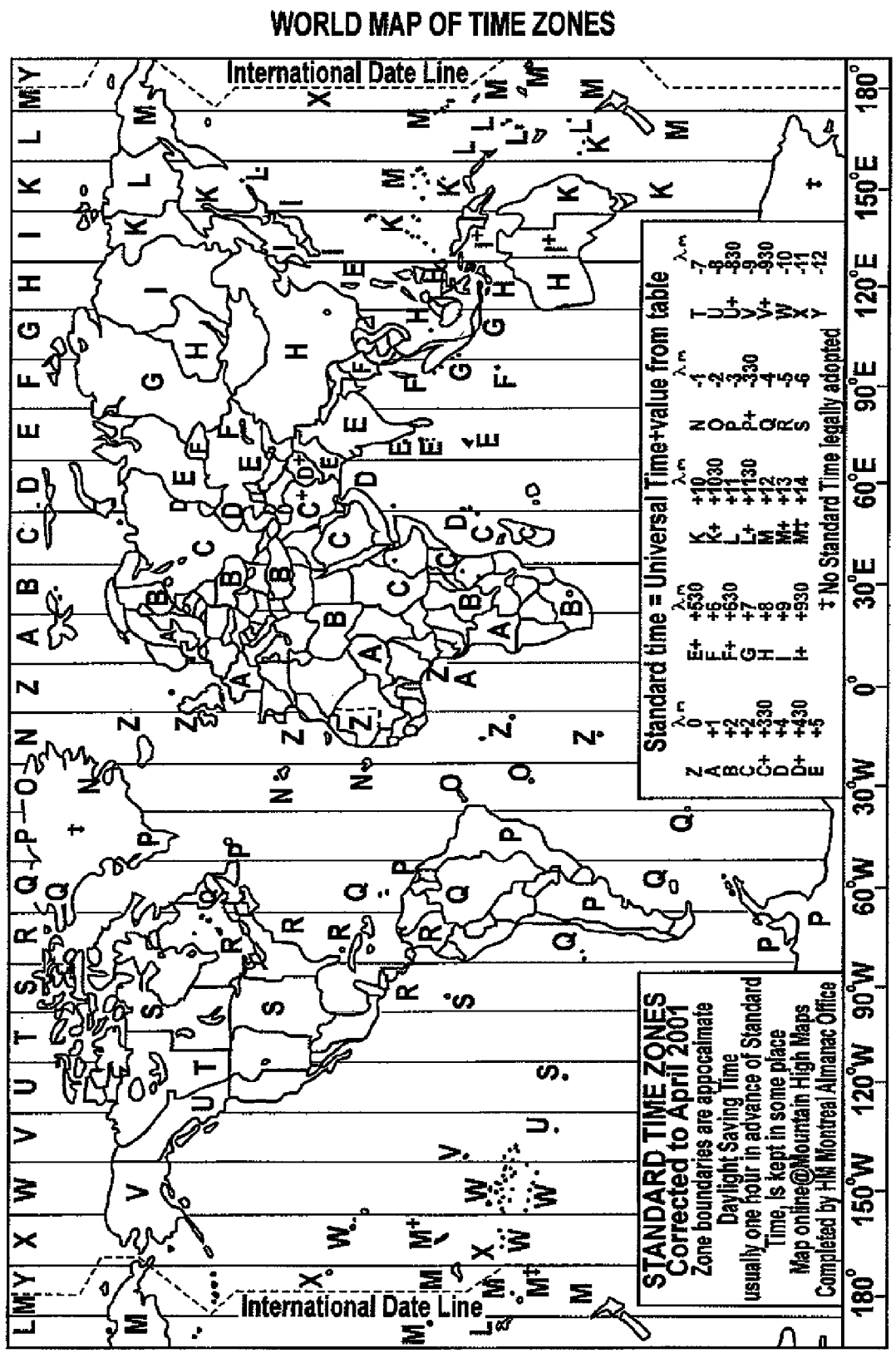
FIG. 4 is a map showing time zones across the world.

Also, as discussed above, it is known that when taking pictures in fluorescent lighting, the photosensor chip 62 must be configured to operate in one of either a 50 Hz mode or a 60 Hz mode in order to eliminate flicker. Whether the photosensor chip 62 should be configured to operate in the 50 Hz mode or the 60 Hz mode depends on where the device 30 is being operated (i.e. in what country). FIG. 4 is a map of time zones circumscribing the world, and Table A correlates standard time zones (i.e. offset from GMT) with the required fluorescent operating mode for the camera application.

TABLE A

| COUNTRY | FREQUENCY | START Z | END Z |
|---|---|---|---|
| Albania | 50 Hz | A | |
| Andorra | 50 Hz | A | |
| Angola | 50 Hz | A | |
| Austria | 50 Hz | A | |
| Belgium | 50 Hz | A | |
| Benin | 50 Hz | A | |
| Bosnia | 50 Hz | A | |
| Cameroon | 50 Hz | A | |
| Central African Republic | 50 Hz | A | |
| Chad | 50 Hz | A | |
| Congo, People's Rep. of | 50 Hz | A | |
| Croatia | 50 Hz | A | |
| Czech Republic | 50 Hz | A | |
| Denmark | 50 Hz | A | |
| France | 50 Hz | A | |
| Gabon | 50 Hz | A | |
| Germany | 50 Hz | A | |
| Gibraltar | 50 Hz | A | |
| Hungary | 50 Hz | A | |
| Italy | 50 Hz | A | |
| Liechtenstein | 50 Hz | A | |
| Luxembourg | 50 Hz | A | |
| Macedonia | 50 Hz | A | |
| Malta | 50 Hz | A | |
| Monaco | 50 Hz | A | |
| Netherlands | 50 Hz | A | |
| Niger | 50 Hz | A | |
| Nigeria | 50 Hz | A | |
| Norway | 50 Hz | A | |
| Poland | 50 Hz | A | |
| Portugal | 50 Hz | A | |
| Serbia | 50 Hz | A | |
| Slovak Republic | 50 Hz | A | |
| Slovenia | 50 Hz | A | |
| Spain | 50 Hz | A | |
| Sweden | 50 Hz | A | |
| Switzerland | 50 Hz | A | |
| Tunisia | 50 Hz | A | |
| Botswana | 50 Hz | B | |
| Bulgaria | 50 Hz | B | |
| Burundi | 50 Hz | B | |
| Congo, Dem. Rep. of (former Zaire) | 50 Hz | B | |
| Cyprus | 50 Hz | B | |
| Egypt | 50 Hz | B | |
| Finland | 50 Hz | B | |
| Greece | 50 Hz | B | |
| Israel | 50 Hz | B | |
| Jordan | 50 Hz | B | |
| Lebanon | 50 Hz | B | |
| Lesotho | 50 Hz | B | |
| Libya | 50 Hz | B | |
| Lithuania | 50 Hz | B | |
| Malawi | 50 Hz | B | |
| Mozambique | 50 Hz | B | |
| Namibia | 50 Hz | B | |
| Romania | 50 Hz | B | |
| Rwanda | 50 Hz | B | |
| South Africa | 50 Hz | B | |
| Sudan | 50 Hz | B | |
| Swaziland | 50 Hz | B | |
| Syria | 50 Hz | B | |
| Turkey | 50 Hz | B | |
| Zambia | 50 Hz | B | |
| Zimbabwe | 50 Hz | B | |
| Bahrain | 50 Hz | C | |
| Belarus | 50 Hz | C | |
| Comoros | 50 Hz | C | |
| Djibouti | 50 Hz | C | |
| Eritrea | 50 Hz | C | |
| Estonia | 50 Hz | C | |
| Ethiopia | 50 Hz | C | |
| Iraq | 50 Hz | C | |
| Kenya | 50 Hz | C | |
| Kuwait | 50 Hz | C | |
| Latvia | 50 Hz | C | |
| Madagascar | 50 Hz | C | |
| Qatar | 50 Hz | C | |
| Russia | 50 Hz | C | |
| Saudi Arabia | 60 Hz | C | |
| Somalia | 50 Hz | C | |
| Tanzania | 50 Hz | C | |
| Uganda | 50 Hz | C | |
| Ukraine | 50 Hz | C | |
| Yemen, Rep. of | 50 Hz | C | |
| Iran | 50 Hz | C* | |
| Armenia | 50 Hz | D | |
| Azerbaijan | 50 Hz | D | |
| Georgia | 50 Hz | D | |
| Mauritius | 50 Hz | D | |
| Oman | 50 Hz | D | |
| Réunion Island | 50 Hz | D | |
| Seychelles | 50 Hz | D | |
| United Arab Emirates | 50 Hz | D | |
| Afghanistan | 50 Hz | D | |
| Maldives | 50 Hz | E | |
| Pakistan | 50 Hz | E | |
| Turkmenistan | 50 Hz | E | |
| India | 50 Hz | E* | |
| Nepal | 50 Hz | E* | |
| Sri Lanka | 50 Hz | E* | |
| Bangladesh | 50 Hz | F | |
| Kazakhstan | 50 Hz | F | |
| Tajikistan | 50 Hz | F | |
| Uzbekistan | 50 Hz | F | |
| Myanmar (formerly Burma) | 50 Hz | F | |
| Cambodia | 50 Hz | G | |
| Laos | 50 Hz | G | |
| Thailand | 50 Hz | G | |
| Thailand | 50 Hz | G | |
| Brunei | 50 Hz | H | |
| China, People's Republic of | 50 Hz | H | |
| Hong Kong | 50 Hz | H | |
| Macau | 50 Hz | H | |
| Malaysia | 50 Hz | H | |
| Mongolia | 50 Hz | H | |
| Philippines | 60 Hz | H | |
| Singapore | 50 Hz | H | |
| Taiwan | 60 Hz | H | G |
| Indonesia | 50 Hz | I | |
| Japan | 50/60 Hz* | I | |
| Korea, South | 60 Hz | I | |
| Australia | 50 Hz | K | G |
| Guam | 60 Hz | K | |
| Micronesia (Federal States of) | 60 Hz | K | |
| Papua New Guinea | 50 Hz | K | |
| New Caledonia | 50 Hz | L | |
| Vanuatu | 50 Hz | L | |
| Fiji | 50 Hz | M | |
| Kiribati | 50 Hz | M | |
| Nauru | 50 Hz | M | |
| New Zealand | 50 Hz | M | |
| Tonga | 50 Hz | M* | |
| Cape Verde | 50 Hz | N | |
| Guinea-Bissau | 50 Hz | N | |
| Argentina | 50 Hz | P | |
| Brazil | 60 Hz | P | R |
| Cuba | 60 Hz | P | |
| Greenland | 50 Hz | P | |
| Guyana | 60 Hz* | P | |
| Uruguay | 50 Hz | P | |
| Suriname | 60 Hz | P* | |
| Anguilla | 60 Hz | Q | |
| Antigua | 60 Hz | Q | |
| Aruba | 60 Hz | Q | |
| Barbados | 50 Hz | Q | |
| Bermuda | 60 Hz | Q | |
| Bolivia | 50 Hz | Q | |
| Canada | 60 Hz | Q | U |
| Chile | 50 Hz | Q | |

TABLE A-continued

| COUNTRY | FREQUENCY | START Z | END Z |
|---|---|---|---|
| Dominica | 50 Hz | Q | |
| Dominican Republic | 60 Hz | Q | |
| Falkland Islands | 50 Hz | Q | |
| French Guiana | 50 Hz | Q | |
| Grenada (Windward Is.) | 50 Hz | Q | |
| Guadeloupe | 50 Hz | Q | |
| Martinique | 50 Hz | Q | |
| Montserrat (Leeward Is.) | 60 Hz | Q | |
| Netherlands Antilles | 50 Hz | Q | |
| Paraguay | 50 Hz | Q | |
| Puerto Rico | 60 Hz | Q | |
| St. Kitts and Nevis (Leeward Is.) | 60 Hz | Q | |
| St. Lucia (Windward Is.) | 50 Hz | Q | |
| Trinidad & Tobago | 60 Hz | Q | |
| Venezuela | 60 Hz | Q | |
| Bahamas | 60 Hz | R | |
| Cayman Islands | 60 Hz | R | |
| Colombia | 60 Hz | R | |
| Ecuador | 60 Hz | R | |
| Haiti | 60 Hz | R | |
| Jamaica | 50 Hz | R | |
| Panama | 60 Hz | R | |
| Peru | 60 Hz* | R | |
| United States of America | 60 Hz | R | X |
| Belize | 60 Hz | S | |
| Costa Rica | 60 Hz | S | |
| El Salvador | 60 Hz | S | |
| Guatemala | 60 Hz | S | |
| Honduras | 60 Hz | S | |
| Mexico | 60 Hz | S | U |
| Nicaragua | 60 Hz | S | |
| Cook Islands | 50 Hz | W | |
| Samoa | 50 Hz | X | |
| Algeria | 50 Hz | Z | |
| Burkina Faso | 50 Hz | Z | |
| Côte d'Ivoire (Ivory Coast) | 50 Hz | Z | |
| Faeroe Islands | 50 Hz | Z | |
| Gambia | 50 Hz | Z | |
| Ghana | 50 Hz | Z | |
| Guinea | 50 Hz | Z | |
| Iceland | 50 Hz | Z | |
| Ireland (Eire) | 50 Hz | Z | |
| Liberia | 60 Hz | Z | |
| Mali | 50 Hz | Z | |
| Morocco | 50 Hz | Z | |
| Senegal | 50 Hz | Z | |
| Sierra Leone | 50 Hz | Z | |
| Togo | 50 Hz | Z | |
| United Kingdom | 50 Hz | Z | |

From Table A, it will be noted that there are a small number of exceptions where there are instances of countries within a particular time zone characterized by a difference in fluorescent operating mode frequency from other countries in that time zone. For example, Saudi Arabia operates at 60 Hz, whereas the rest of the countries in standard time zone C operate at 50 Hz. For these rare occurrences, the user can 'force' the correct fluorescent operating mode by configuring the device 30 to operate in a different time zone with the desired frequency.

Figure 5:
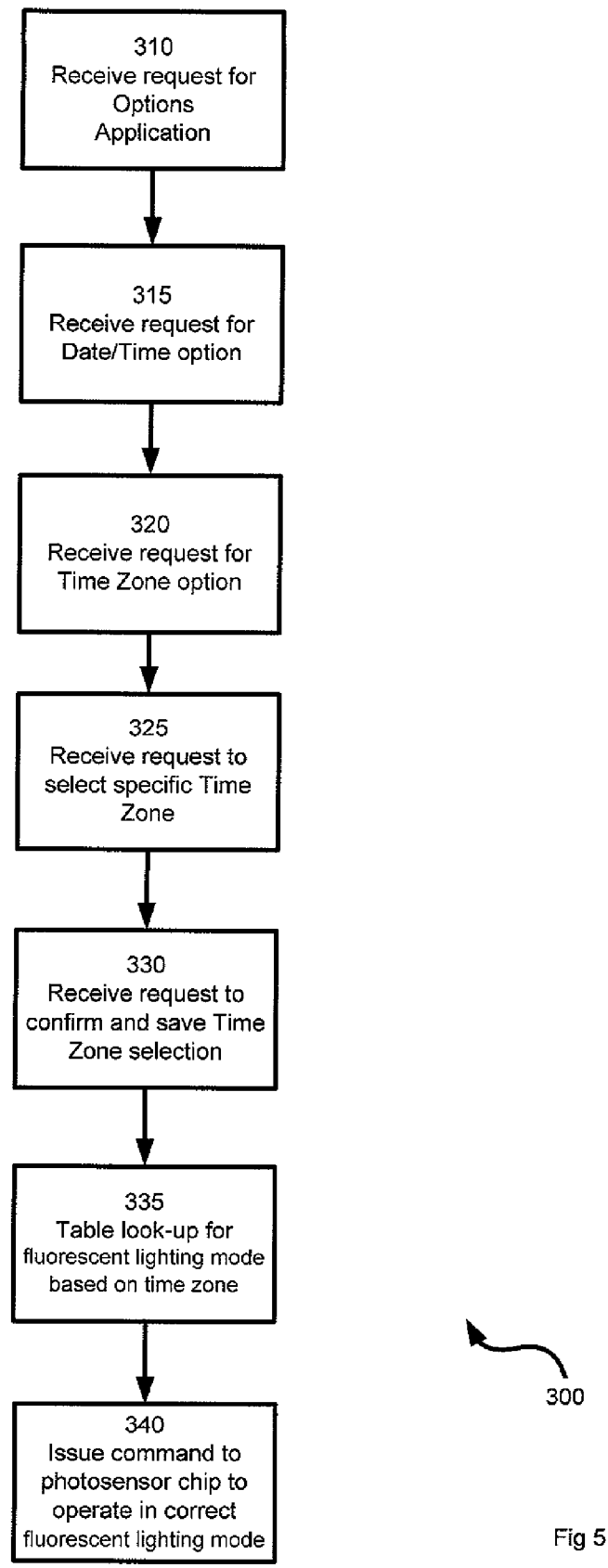
FIG. 5 is a flowchart depicting a method of controlling the fluorescent operating mode of the camera application for the portable electronic device in accordance with FIGS. 1-3.

Referring now to FIG. 5 a method of controlling the fluorescent operating mode of the camera application for the portable electronic device 30 is represented in a flowchart and indicated generally at 300. To assist in understanding method 300, the method will be explained in terms of its performance using device 30. However, it is to be understood that this discussion is not be construed in a limiting sense, and that method 300 can be performed on devices other than device 30, and/or that method 300 can be varied.

Figure 6A:
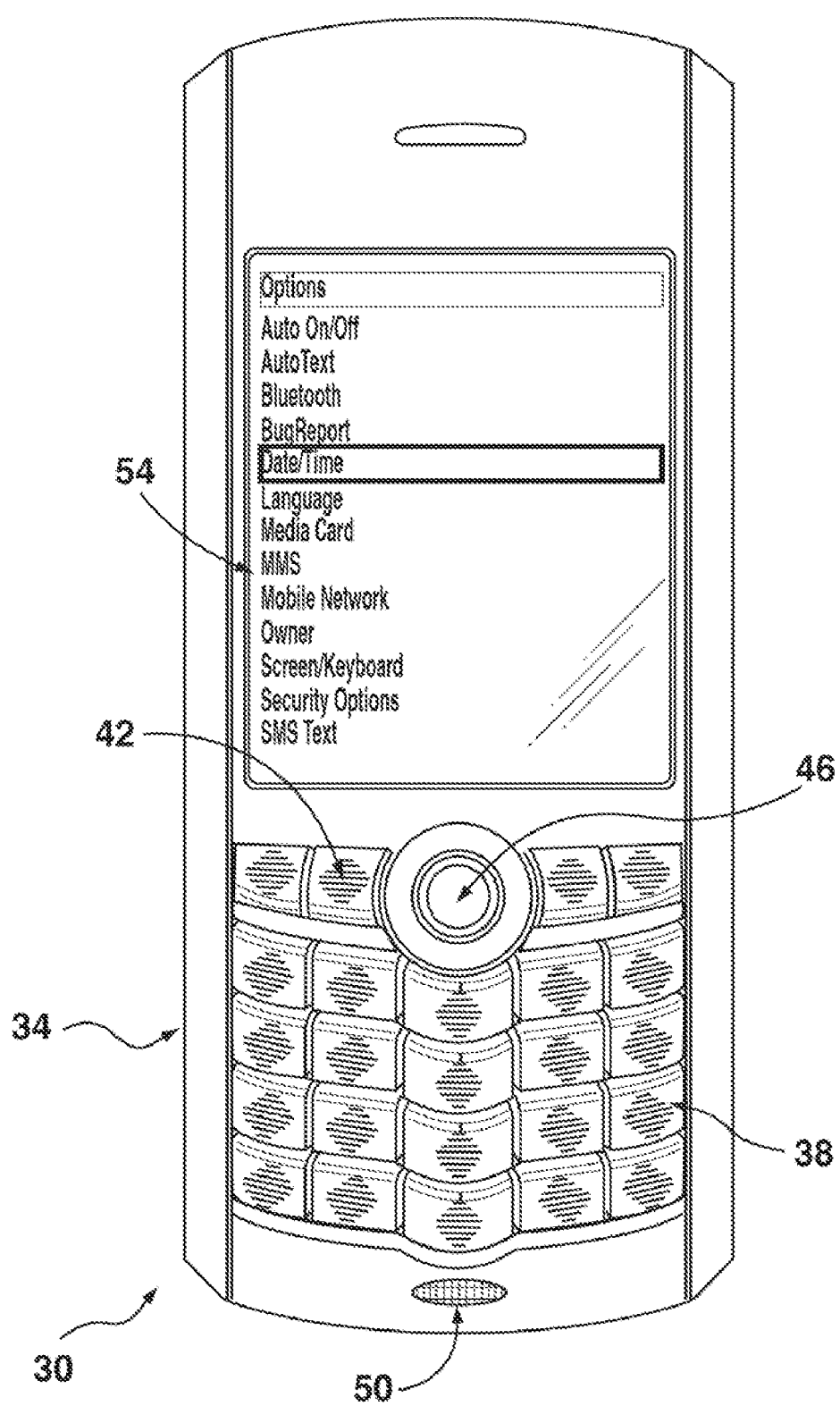
FIGS. 6A, 6B and 6C show menu screens on the device in FIG. 1 for selecting a time zone.

Beginning at step 310, the user chooses an Options icon from the main menu (not shown), for example by user rotation of trackball 46 for scrolling through the various device applications, until the Options icon is highlighted on display 54 (not shown). Once highlighted, the user can depress trackball 46 to activate the Options application, resulting in the menu display of FIG. 6A. When processor 78 receives an input via trackball 46 that the user desires to activate the Options application, method 300 will advance from step 310 to step 315.

Figure 6B:
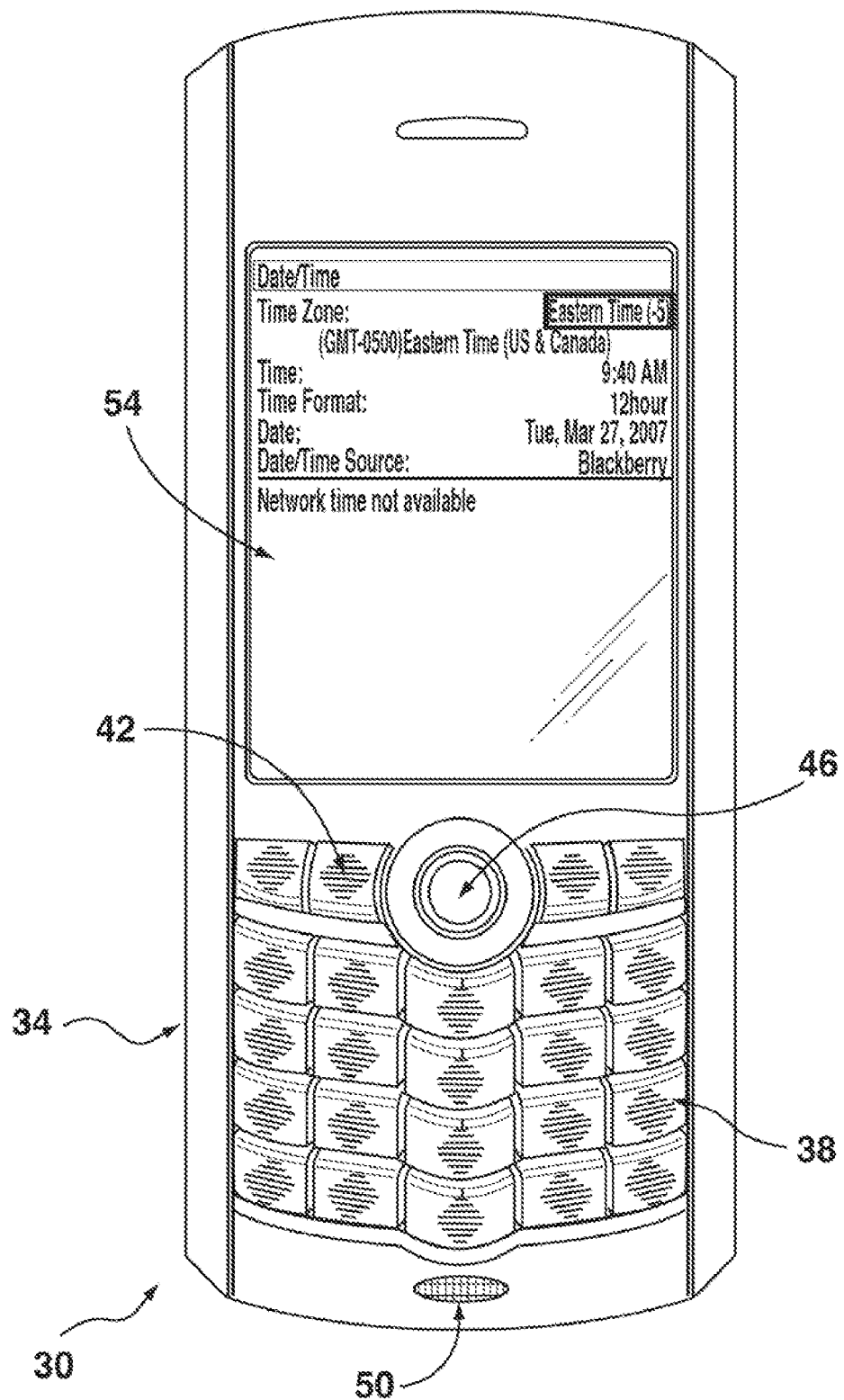
Figure 6C:
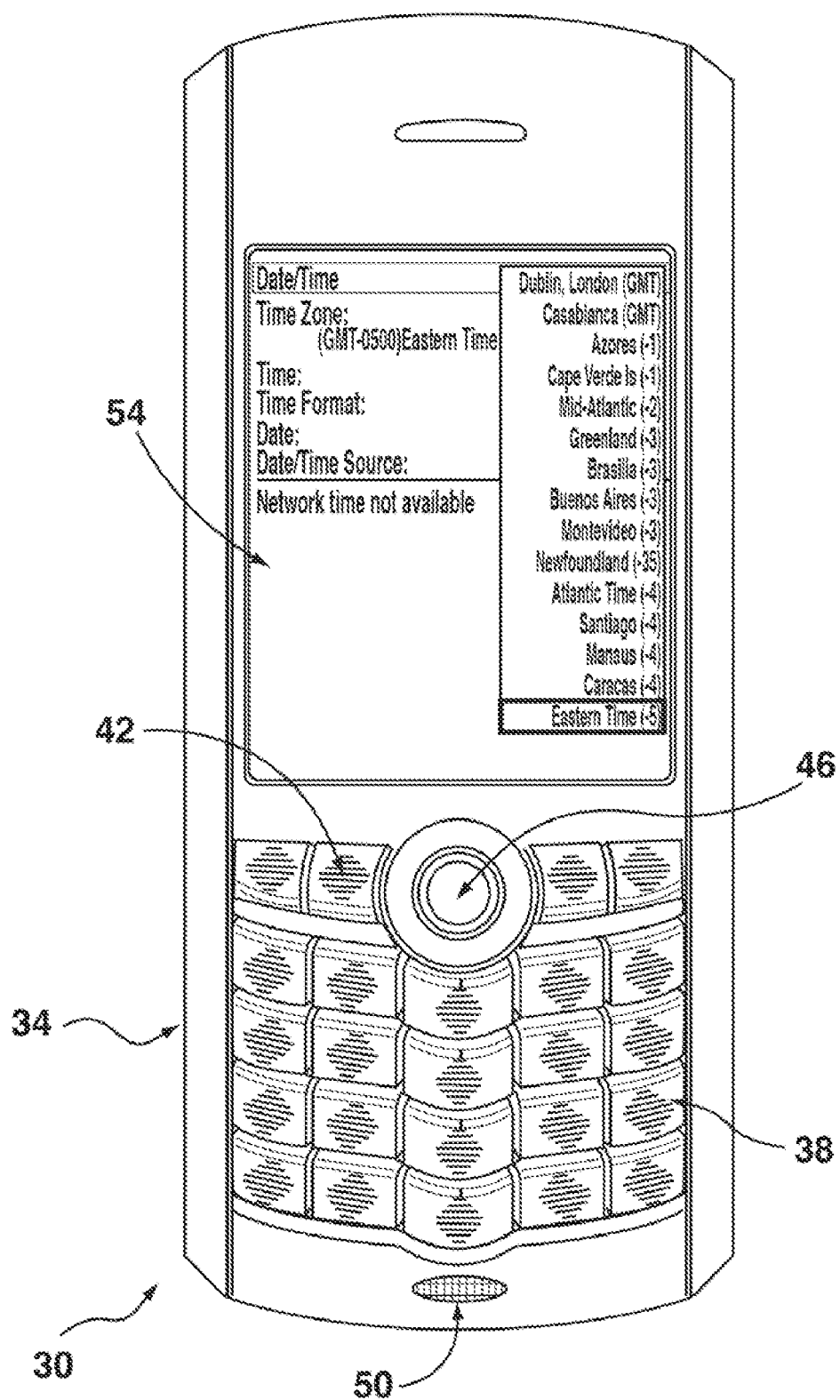

Next, at step 315, the user rotates the trackball 46, to choose Date/Time, and then depresses trackball 46, resulting in the menu display of FIG. 6B. With the cursor position over the "Time Zone" field, the user depresses trackball 46 (step 320), resulting in a drop down menu in display 54, as shown in FIG. 6C. The user may then, at step 325, select the time zone in which device 30 is located. For example, the user may select Eastern Time, as shown in the highlighted portion of FIG. 6C. The user may then depress the trackball 46 to confirm the time zone selection, and depresses the trackball once more to Save the selection (step 330).

It should be noted that the foregoing description of a method for selecting a time zone within which the device 30 is to operate, is purely exemplary. Many other methods may be used depending on the nature of the device 30. For example, the user may instead configure the appropriate time zone by launching a "setup wizard" upon initializing the device 30. Time zone information can also be received wirelessly via radio 86 (e.g. in communication with a basestation or a wireless network, as a result of a regular network update or network ping messages). Time zone information can also be determined by GPS location (e.g. GPS coordinates may indicate that the device 30 is in Toronto, with the result that the appropriate time zone is Eastern Standard Time). Likewise, time zone information may also be extracted from file information relating to pictures taken, for example, if pictures are taken and then saved in a folder including the name "NYC" or "Paris", the device 30 can surmise its location and thereby automatically configure the appropriate time zone.

Once the user has configured the correct operating time zone for the device 30, processor 78 consults a table stored in persistent storage device 82 (step 335) containing a correlation of the configured time zone with the appropriate fluorescent lighting mode (i.e. 50 Hz or 60 Hz), as set forth in Table A, above. Upon determining the correct fluorescent lighting mode, processor 78 then issues a command to photosensor chip 62, indicating the correct fluorescent lighting mode (step 340), whereupon the chip 62 operates in accordance with the appropriate fluorescent lighting mode to eliminate flicker from captured images (e.g. using a technique such as set forth in U.S. Pat. Nos. 6,271,884 or 7,187,405).

The foregoing represents exemplary embodiments and is not intended to restrict the scope of the claims attached hereto. For example, it is contemplated that the device 30 may be programmed to automatically update time zone information when the user moves from one location to another. This and all other such alternatives are believed to be within the sphere and scope of the attached claims.

The invention claimed is:

1. A method for controlling operation of a photosensor array in a portable electronic device to reduce flicker resulting from fluorescent light having a periodic intensity, the method comprising:
   selecting a time zone in which said device is to be operated;
   determining a corresponding frequency of said fluorescent light from the selected time zone by using a table containing a list of time zones and corresponding frequencies; and
   signaling said photosensor array to operate in accordance with a mode arranged to reduce flicker based on said corresponding frequency.

2. The method of claim 1 wherein said corresponding frequency is one of either 50 Hz or 60 Hz.

3. The method of claim 1 wherein selecting the time zone comprises user manipulation of an input device on said portable electronic device.

4. The method of claim 1 wherein said mode is one of either a 50 Hz fluorescent operating mode or a 60 Hz fluorescent operating mode.

5. The method of claim 1 wherein said mode includes filtering out beats associated with a 100 Hz intensity resulting from capturing an image illuminated with 50 Hz fluorescent light at a frame rate of 30 Hz.

6. The method of claim 1 wherein said mode includes synchronizing a frame capture rate of said photosensor array to 100 Hz beats resulting from capturing an image illuminated with 50 Hz fluorescent light.

7. The method of claim 1 wherein said mode includes setting an integration time for each pixel of the photosensor array to an integral multiple of said corresponding frequency.

8. A portable electronic device comprising:
   at least one user input device for selecting a time zone in which said device is to be operated;
   a chip having a photosensor array adapted to operate in one of a plurality of modes for reducing flicker resulting from fluorescent light having a periodic intensity;
   a display;
   a persistent storage device storing a table containing a list of time zones and corresponding frequencies; and
   a processor interconnecting said user input device, said chip, said display, and said persistent storage device that determines a corresponding frequency of said fluorescent light from the selected time zone by using said table and signals said chip to operate in accordance with a mode arranged to reduce flicker based on said corresponding frequency.

9. The device of claim 8, wherein said at least one user input is a trackball.

10. The device of claim 8 wherein said plurality of modes include a 50 Hz fluorescent operating mode and a 60 Hz fluorescent operating mode.

11. The device of claim 8 wherein said chip filters out beats associated with a 100 Hz intensity resulting from capturing an image illuminated with 50 Hz fluorescent light at a photosensor array frame rate of 30 Hz.

12. The device of claim 8 wherein said chip synchronizes a frame capture rate of said photosensor array to 100 Hz beats resulting from capturing an image illuminated with 50 Hz fluorescent light.

13. The device of claim 8 wherein said chip sets an integration time for each pixel of the photosensor array to an integral multiple of said corresponding frequency.

14. A persistent storage device for storing a set of programming instructions in executable form according to the method of claim 1.

15. A persistent storage device having a computer readable program code adapted to be executed to implement a method for controlling operation of a photosensor array in a portable electronic device to reduce flicker resulting from fluorescent light having a periodic intensity, the method comprising:
    selecting a time zone in which said device is to be operated;
    determining a corresponding frequency of said fluorescent light from the selected time zone by using a table containing a list of time zones and corresponding frequencies; and
    signaling said photosensor array to operate in accordance with a mode arranged to reduce flicker based on said corresponding frequency.

16. The persistent storage device of claim 15, wherein said corresponding frequency is one of either 50 Hz or 60 Hz.

17. The persistent storage device of claim 15, wherein said mode is one of either a 50 Hz fluorescent operating mode or a 60 Hz fluorescent operating mode.

18. The persistent storage device of claim 15, wherein said mode includes filtering out beats associated with a 100 Hz intensity resulting from capturing an image illuminated with 50 Hz fluorescent light at a frame rate of 30 Hz.

19. The persistent storage device of claim 15, wherein said mode includes synchronizing a frame capture rate of said photosensor array to 100 Hz beats resulting from capturing an image illuminated with 50 Hz fluorescent light.

20. The persistent storage device of claim 15, wherein said mode includes setting an integration time for each pixel of the photosensor array to an integral multiple of said corresponding frequency.

* * * * *